(12) United States Patent
Binder (10) Patent No.: US 8,245,977 B2
(45) Date of Patent: Aug. 21, 2012

(54) APPARATUS FOR THE PIVOTAL FASTENING OF AN ACTIVE SURFACE, IN PARTICULAR A SPOILER ON A WIND TUNNEL MODEL OF AN AIRCRAFT

(75) Inventor: Michael Binder, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 876 days.

(21) Appl. No.: 12/343,756

(22) Filed: Dec. 24, 2008

(65) Prior Publication Data

US 2009/0166475 A1 Jul. 2, 2009

Related U.S. Application Data

(60) Provisional application No. 61/016,981, filed on Dec. 27, 2007.

(30) Foreign Application Priority Data

Dec. 27, 2007 (DE) .......................... 10 2007 062 736

(51) Int. Cl.
*B64C 1/06* (2006.01)
(52) U.S. Cl. ....... 244/131; 244/1 R; 73/37.5; 73/118.03; 73/147; 403/DIG. 9; 403/24; 403/107; 403/106

(58) Field of Classification Search .................. 244/131, 244/1 R; 73/37.5, 118.03, 147; 403/DIG. 9, 403/24, 107, 106
See application file for complete search history.

(56) References Cited

U.S. PATENT DOCUMENTS

| | | | | |
|---|---|---|---|---|
| 4,207,764 A * | 6/1980 | Wallace | ........................... | 73/147 |
| 4,284,254 A * | 8/1981 | Rieben | ........................ | 244/99.2 |
| 4,920,791 A * | 5/1990 | Griffin | ........................... | 73/147 |
| 5,020,364 A * | 6/1991 | Manitt et al. | .................... | 73/147 |
| 5,345,818 A * | 9/1994 | Magill et al. | .................... | 73/147 |
| 6,571,618 B2 * | 6/2003 | Demay et al. | ................... | 73/147 |

FOREIGN PATENT DOCUMENTS

| | | |
|---|---|---|
| DE | 295 01 392 | 5/1995 |
| DE | 102 08 258 | 9/2003 |
| DE | 103 52 130 | 5/2004 |

* cited by examiner

*Primary Examiner* — J. Woodrow Eldred
(74) *Attorney, Agent, or Firm* — Greenblum & Bernstein, P.L.C.

(57) ABSTRACT

An apparatus for pivotally fastening an aerodynamic surface. The apparatus includes a bearing block. A clamping block is connected to the bearing block and includes at least two elongate holes. A pivotally mounted strip member is coupled to the aerodynamic surface and to the clamping block. At least one fastening device is insertable into each of the at least two elongate holes for locking the clamping block relative to the bearing block. The aerodynamic surface is lockable in at least one angular position.

23 Claims, 4 Drawing Sheets

APPARATUS FOR THE PIVOTAL FASTENING OF AN ACTIVE SURFACE, IN PARTICULAR A SPOILER ON A WIND TUNNEL MODEL OF AN AIRCRAFT

CROSS-REFERENCE TO RELATED APPLICATIONS

The present application is a non-provisional of U.S. Provisional Application 61/016,981 filed Dec. 27, 2007; and claims priority under 35 U.S.C. §119 of German Patent Application No. DE 10 2007 062 736.1 filed Dec. 27, 2007. Moreover, the disclosures of the U.S. Provisional Application and of the German priority document are expressly incorporated by reference herein in their entireties.

BACKGROUND OF THE INVENTION

1. Field of the Invention

The invention relates to an apparatus and method for pivotal fastening of an active surface. The active surface may, in particular, be arranged on a spoiler. The apparatus may be mounted to a wind tunnel model of an aircraft, and can comprise a bearing block and a strip pivotally mounted on a shaft, wherein the strip is connected to the active surface.

2. Discussion of Background Information

Every new type of aircraft requires complex and comprehensive aerodynamic tests and measurements in the wind tunnel. To this end, realistic, true-to-scale models are produced, which are introduced into the wind tunnel by a model suspension. The aircraft models are generally equipped, at least in part, with the same aerodynamic active surfaces as the original to be simulated. Thus, a complex wind tunnel model of an aircraft can be equipped, for example, with ailerons, elevators, a rudder, landing flaps, and high-lift systems. In addition, spoilers, winglets, or engine simulators may be provided to increase the reality of the simulation in the wind tunnel.

All aerodynamic and/or active surfaces have in common that they must be tested in a plurality of angular positions in the wind tunnel to do justice to all the situations arising in everyday flying operation.

In the known embodiments of wind tunnel models, for example, spoilers are attached to the wind tunnel model with a fixed angular position in each case, with the result that in particular a high time expenditure for retrofitting the aircraft model is obtained when conducting comprehensive series of measurements with plurality of aerodynamic surfaces set at different angles in each case. The retrofitting expenditure is of marked importance given the high wind tunnel utilization costs. In addition, it is necessary in this case to hold in readiness a large number of spoilers with different angular positions in each case, resulting in a higher production and storage expenditure.

Alternatively, it is possible to dispose a spoiler pivotally on a shaft and firmly clamp the spoiler on the shaft with a screw connection when a defined angular position is reached. However, this holder has the disadvantage of a relatively high imprecision. In addition, an uncontrolled angular adjustment of the spoiler, and measurement errors thereby induced in the wind tunnel are possible due to the large lever effect of the active surface on the shaft.

DE 295 01 392 U1 discloses an adjustable shaft component in which a vertical tube is fixed with one end pivotally on the end of a horizontal tube, wherein two locking blocks of the shaft component are pressed firmly against one another with a screw connection for fixing the instantaneous pivoting position of the vertical tube. DE 102 08 258 B4 describes an apparatus for providing a variable flow profile. A drive of a linear thrust element is known from DE 103 52 130 A1.

SUMMARY OF THE INVENTION

The invention provides an apparatus for the pivotal fastening aerodynamic active surfaces on wind tunnel models for aircraft, which allows a precise angular adjustment of the aerodynamic surface concerned in a sufficiently large angular range and at the same time allows a secure fixing of the adjusted angular position with respect to external influences. In addition, the apparatus preferably utilizes the smallest possible number of components and is preferably capable of being produced in large numbers with reasonable expenditure on production technology.

According to embodiments of the invention, an apparatus is provided for pivotal fastening of an aerodynamic surface or active surface or active flap or adjusting flap, in particular, a spoiler on a wind tunnel model of an aircraft, wherein the apparatus comprises a bearing block and a strip or plate accommodated pivotally thereon on a shaft. The strip or the plate is connected to the active surface and is operatively connected to a clamping block. The clamping block can be connected to the bearing block for locking the active surface in an arbitrary angular position.

The operative connection may be formed in this case with a rack and a ring gear segment, which intermesh with one another and which are each configured as integral components respectively of the strip and the clamping block. At the same time, it can be provided, in particular, that the rack and the ring gear segment are provided with an involute toothing.

The clamping block may have at least two elongate holes, into which in each case at least one fastening device for locking the clamping block on the bearing block can be inserted. According to a further exemplary embodiment, the bearing block underside has a rectangular recess for displaceable accommodation of the clamping block, wherein the clamping block is displaceable transversely to the shaft.

According to embodiments of the invention, it can generally be provided that a bearing block upper side has a substantially U-shaped recess, in which two bearings can be fastened for bilateral accommodation of the shaft.

According to a further exemplary embodiment, the apparatus for pivotal fastening of an active surface according to the invention may be configured in such a manner that the active surface may be adjusted and locked in an angular position between −15° and +45° in relation to the bearing block upper side by the clamping block.

According to embodiments of the invention, the apparatus for pivotal fastening of an active surface according to the invention may be configured in such a manner that the bearing block can be fastened on a wind tunnel model of an aircraft. According to the invention, there is provided, in particular, a wind tunnel model of an aircraft comprising an apparatus for pivotal fastening of an active surface or active flap or adjusting flap for influencing the aerodynamic operating mode of the aircraft in its state subjected to incomings flow according to one exemplary embodiment of the invention, and such a wind tunnel model of an aircraft with such an active surface or active flap or adjusting flap.

Since, according to an embodiment of the invention, the strip is operatively connected to a clamping block and the clamping block may be connected to the bearing block for locking the active surface in an arbitrary angular position, when the active surface is locked or fixed in its respective angular position, only relatively small lever forces act on the clamping block so that an uncontrolled adjustment of the active surface as a result of external mechanical influences, which could lead to a considerable errors of the measurement results obtained in the wind tunnel, is almost completely eliminated.

According to a further embodiment of the invention, the operative connection is formed with a rack and a ring gear segment which intermesh with one another and which are formed in each case as integral components of the strip and the clamping block. As a result, a largely play-free angular adjustability is achieved with a sufficiently large angular range of the aerodynamic active surface. In addition, the lever forces emanating from the aerodynamic active surface are minimized and the coupling is additionally free from play and self-inhibiting, so that uncontrolled adjusting movement of the spoiler are reliably eliminated when the clamping block is fixed.

Alternatively, the operative connection can be formed, for example, by an elastic steel strip, which is disposed between the strip and the clamping block and which can transmit tensile forces as well as compressive forces in equal measure. Due to the elastic steel strip, the pivoting or the turning movement of the aerodynamic active surface is converted into a linear to-and-fro movement of the clamping block in the same way as with a coupling through a toothed structure.

The active surface articulated by the apparatus preferably comprises an aerodynamic active surface on a wind tunnel aircraft model such as, for example, a spoiler, an aileron, elevator, rudder, a landing flap or the like. Alternatively, the active surface may also be an aquadynamic surface such as, for example, a rudder, a transverse stabilizer, a trim flap, a sensor flap, or the like on an aquadynamic model, for example, a ship model for measurement purposes in a wind tunnel.

According to a further development of the apparatus, the toothings of the rack and the ring gear segments are configured as involute toothings or teeth. Easier operation of the apparatus is achieved by using an involute toothing compared with a triangular toothing.

According to a further embodiment of the apparatus according to the invention, the clamping block is provided with at least two elongate holes, into which at least one fastening device may be inserted for fixing the clamping block on the bearing block. As a consequence of the elongate holes, sufficient displaceability of the clamping block transverse to the position of the shaft is provided.

The invention also relates to an apparatus for pivotally fastening an aerodynamic surface, wherein the apparatus comprises a bearing block, a clamping block connected to the bearing block and comprising at least two elongate holes, a pivotally mounted strip member coupled to the aerodynamic surface and to the clamping block, and at least one fastening device insertable into each of the at least two elongate holes for locking the clamping block relative to the bearing block. The aerodynamic surface is lockable in at least one angular position.

The strip member may be pivotally mounted to the bearing block via a shaft. The aerodynamic surface may be arranged on a movable member and the strip member is fixable to the movable member.

The apparatus may further comprise a rack and a ring gear segment intermeshing with one another. The rack may be arranged on the clamping block and the ring gear segment may be arranged on the strip member. The rack may be integrally formed with the clamping block and the ring gear segment may be integrally formed with the strip member. The rack and the ring gear segment may each include one of teeth and involute teeth.

The bearing block may comprise a rectangular recess adapted to movably receive therein the clamping block. The rectangular recess may be arranged on an underside of the bearing block and wherein the clamping block is displaceable transversely relative to a shaft that couples the strip member to the bearing block. The bearing block may comprise a recess which receives therein two bearings. The recess may be arranged on an upper side of the bearing block and is substantially U-shaped and the two bearings may be capable of being fastened in the recess and capable of coupling the strip member to the bearing block via a shaft. The bearing block may be capable of being fastened to a wind tunnel model of an aircraft. At least one of the at least one angular position is between −15° and +45° in relation to an upper side of the bearing block and the aerodynamic surface is lockable via the clamping block in the at least one angular position.

The invention also provides for a method of locking an aerodynamic surface in at least one angular position using the apparatus described above, wherein the method comprises pivoting the aerodynamic surface relative to the bearing block and locking the aerodynamic surface in at least one angular position.

The invention also relates to an apparatus for pivotally fastening an aerodynamic surface, wherein the apparatus comprises a bearing block, a clamping block connected to the bearing block, a pivotally mounted strip member coupled to the aerodynamic surface and the clamping block, and a rectangular recess arranged on the bearing block and being adapted to receive therein the clamping block. The clamping block is capable of moving within the rectangular recess and the aerodynamic surface is lockable in at least one angular position.

The strip member may be pivotally mounted to the bearing block via a shaft. The apparatus may further comprise a rack and a ring gear segment intermeshing with one another, wherein one of the rack is integrally formed with the clamping block and the ring gear segment is integrally formed with the strip member and the rack is arranged on the clamping block and the ring gear segment is arranged on the strip member. The rectangular recess may be arranged on an underside of the bearing block and the clamping block may be displaceable transversely relative to a shaft that couples the strip member to the bearing block.

The bearing block may comprise a recess which receives therein two bearings, wherein the recess is arranged on an upper side of the bearing block and is substantially U-shaped, and wherein the two bearings are capable of being fastened in the recess and capable of coupling the strip member to the bearing block via a shaft. The bearing block may be capable of being fastened to a wind tunnel model of an aircraft, the at least one angular position may be between −15° and +45° in relation to an upper side of the bearing block, and the aerodynamic surface may be lockable via the clamping block in the at least one angular position.

The invention also provides for a method of locking an aerodynamic surface in at least one angular position using the apparatus described above, wherein the method comprises pivoting the aerodynamic surface relative to the bearing block and locking the aerodynamic surface in at least one angular position.

The invention also relates to an apparatus for pivotally fastening an aerodynamic surface to a wind tunnel model, wherein the apparatus comprises a mountable member mountable to the wind tunnel model, an adjustment member adjustably coupled to the bearing block, a strip member coupled to the aerodynamic surface and pivotally mounted to the mountable member via a shaft, and fasteners for locking the adjustment member in at least one position relative to the bearing block. The aerodynamic surface is lockable in at least one angular position via the adjustment member.

The invention also provides for a method of locking an aerodynamic surface in at least one angular position using the apparatus described above, wherein the method comprises pivoting the aerodynamic surface relative to the bearing block and locking the aerodynamic surface in at least one angular position.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
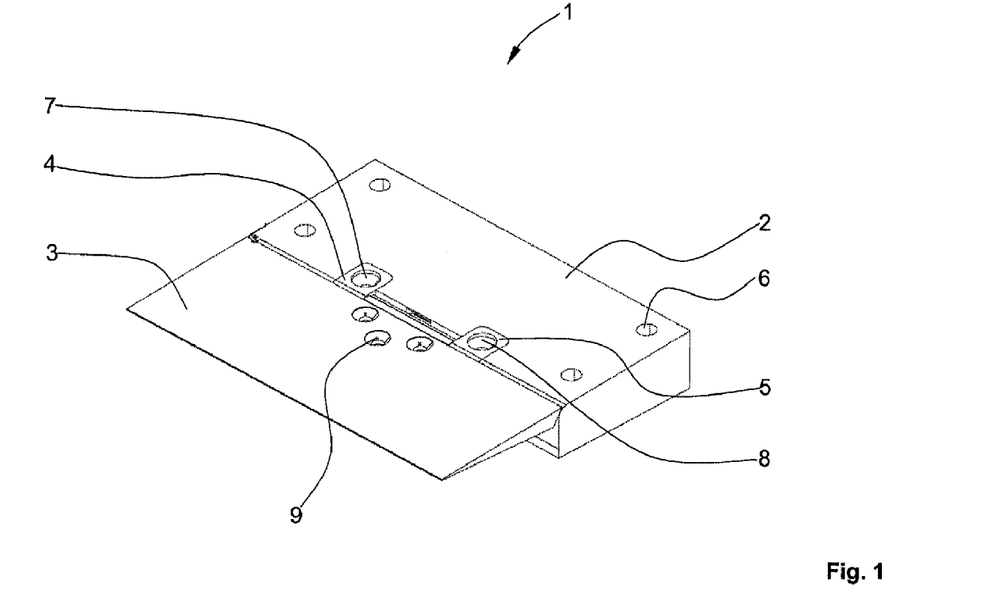
FIG. 1 shows an aerodynamic plan view of the mounted apparatus with a horizontal aerodynamic active surface (spoiler)

FIG. 1 shows an isometric view of an apparatus 1 according to the invention for pivotal and lockable fastening of an aerodynamic active surface on a wind tunnel model of an aircraft.

The apparatus 1 comprises, inter alia, a bearing block 2 which can be mounted to the wind tunnel aircraft model. An aerodynamic active surface for the wind tunnel aircraft model is not shown. The apparatus 1 includes an active surface that is configured in the exemplary embodiment shown as a spoiler 3, as well as two bearings 4, 5 for the pivotal accommodation of the spoiler 3 in the bearing block 2. In the exemplary embodiment shown in FIG. 1, a total of four holes are incorporated in the bearing block 2, of which one hole 6 is provided with a reference numeral as representative for the others. Fastening device (not shown), which can, in particular, be screws or the like, are inserted in the holes of the bearing block 2, by which the apparatus 1 or the bearing block 2 is fastened on the aircraft model. The bearings 4, 5 each have a fastening hole 7, 8, into which fastening device, likewise not shown, in particular, the screws, may be inserted to connect the two bearings 4, 5 to the bearing block 2. In addition, the spoiler 3 is likewise provided with three fastening holes, of which only one hole 9 is provided with a reference numeral as representative for the others. The three fastening holes in the spoiler 3 serve for fixing the spoiler 3 on a (hinge) strip 22 located thereunder, which is covered by the spoiler 3 in FIG. 1 (see, in particular, FIG. 5), by suitable fastening devices, in particular screws or the like. All the fastening holes 6 to 9 may have countersinks if necessary in order to ensure an aerodynamically "smooth" or flush and flow-favorable fastening of all the individual parts inside the apparatus 1 in conjunction with correspondingly configured screw heads and to ensure this on the (wind tunnel) aircraft model itself. In the diagram shown in FIG. 1, the angular position of the spoiler 3 relative to a bearing block upper side is about 0°.

As the description is continued further, reference is made at the same time to FIGS. 2 to 5.

Figure 2:
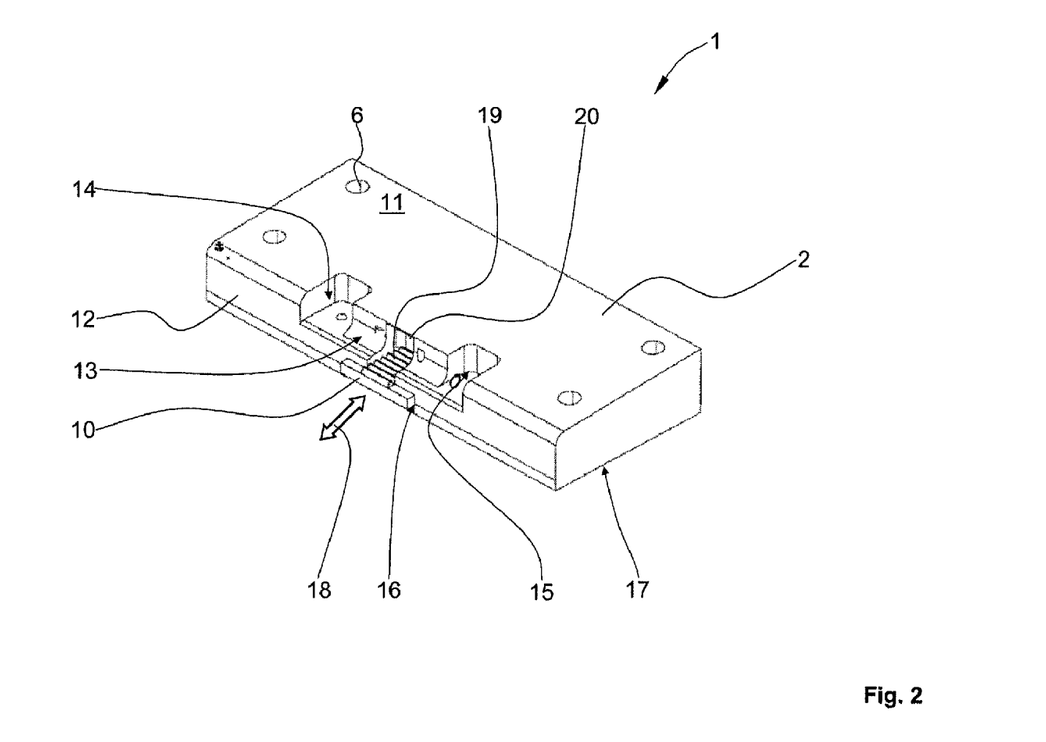
FIG. 2 shows an isometric view of a bearing block of the apparatus with inserted clamping block.

FIG. 2 shows the bearing block 2 with an inserted clamping block 10. In a bearing block upper side 11, a substantially U-shaped recess 13 with two legs 14, 15 is incorporated in the area of a bearing block front side 12 (face side). The clamping block 10 (or sliding block) is displaceably accommodated in a substantially rectangular recess 16 in a bearing block underside 17. In this case, the clamping block 10 is displaceable in the direction of the double arrow. The clamping block 10 is provided with a clamping block toothing, which is preferably designed as a rack 19. The rack 19 is an integral component of the clamping block 10.

The clamping block 10 including the rack 19 is usually fabricated in one piece by a wire erosion technique from a high-strength steel material while the bearing block 2 as well as the spoiler 3 are preferably formed of an aluminum alloy material.

In the area of a rear side not shown, the U-shaped recess 13 has a delimiting recess 20, which serves to delimit the pivoting angle of the spoiler 3 by cooperating with further components.

Figure 3:
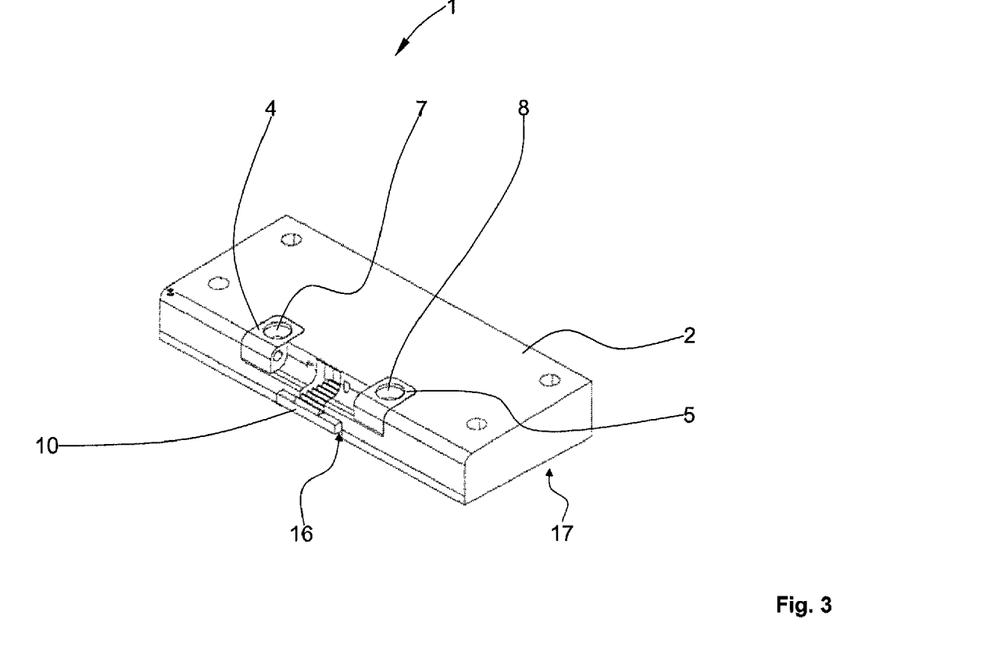
FIG. 3 shows an isometric view of the bearing block with bearings inserted on both sides for the shaft and the clamping block.
Figure 4:
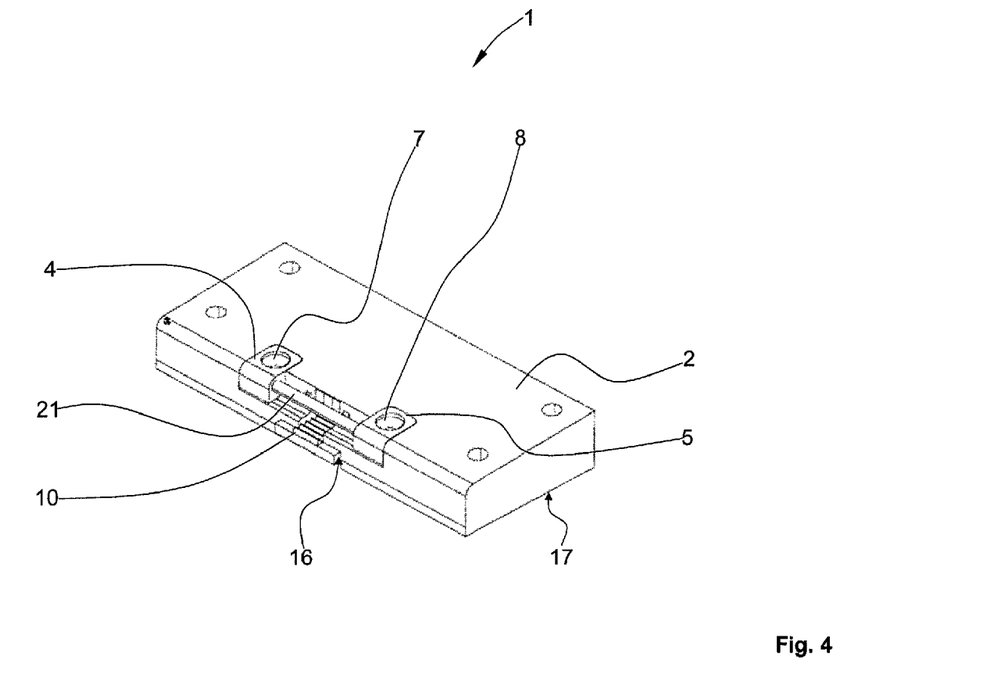
FIG. 4 shows an isometric view of the bearing block with bearings inserted on both sides, mounted shaft, and the clamping block.

Unlike the diagram in FIG. 2, in the bearing block 2 in FIG. 3, the bearings 4, 5 are already inserted with the fastening holes 7, 8 on both sides for receiving a shaft 21 depicted in FIG. 4. The shaft 21 serves for pivotal mounting of a strip not shown in FIGS. 1 to 4, on which the spoiler 3 is fixed with fastening devices, preferably screws or the like. The clamping block 10 is in turn accommodated in the rectangular recess 16 in the bearing block underside 17. The shaft 21 is preferably formed of a high-strength steel, the material of the bearings 4, 5 being selected with regard to minimizing friction and wear. For example, the bearings 4, 5 can be formed of a brass alloy.

Figure 5:
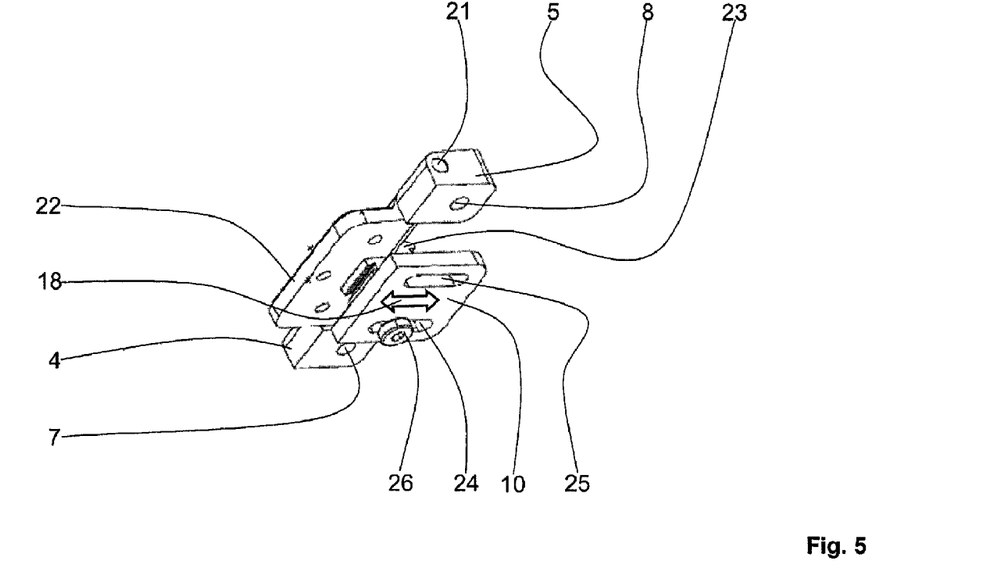
FIG. 5 shows an underside isometric view of the complete adjusting mechanism for the active surface.

FIG. 5 illustrates the adjusting mechanism of the apparatus 1 which has been completely released from the bearing block 2 for better clarity, comprising the two bearings 4, 5, the shaft 21, and the substantially rectangularly configured clamping block 10. The bearings 4, 5 are provided with fastening holes 7, 8. Through the fastening holes 7, 8, the clamping block 10 is fastened in the two legs 14, 15 of the U-shaped recess 13 (see, in particular, FIG. 2).

A plate or a strip 22, for example, a rectangular strip, is pivotally accommodated on and/or mounted to the shaft 21. The plate or the strip 22 is, in particular, connected or coupled in a rotationally fixed manner to the shaft 21. Alternatively, the plate or the strip 22 can be mounted rotatably on the shaft 21. Three, preferably arranged in a triangular pattern, fastening holes are incorporated in the strip 22, into which suitable fastening devices, in particular, countersunk screws or the like, may be inserted, to fasten the spoiler 3 on the strip 22. As a result, it is at the same time easy to exchange the spoiler 3. This exchangeability is important, for example, when a plurality of spoilers 3 having different profile geometries are to be tested in respect of their fluid-dynamic effect on the aircraft in the wind tunnel. The strip 22 is provided with a strip toothing configured as a ring gear segment 23, which is preferably also an integral component of (or integrally formed with) the strip 22. The ring gear segment 23 is connected rotationally fixedly to the plate or the strip 22 when viewed in the direction of the longitudinal extension of the shaft 21. The ring gear segment 23 is intermeshed with the rack 19 in every possible and functionally reliable angular position of the spoiler 3. The ring gear segment 23 extends over a (circular) angle of about 270° (¾*π) in order to allow an angular adjustment of the spoiler 3 between −15° and +45° in each case in relation to the bearing block upper side 11 (0 degrees) not shown. The clamping block 10 furthermore has two elongate holes 24, 25 in order to fasten the clamping block 10 displaceably in the rectangular recess 16 in the bearing block underside 17 parallel to the arrow 18, by at least two fastening devices, in particular by screws or the like, of which only one screw 26 is shown in FIG. 5.

After releasing the clamping block 10 by loosening the fastening screws, the spoiler 3 can be brought into a desired angular position by simply pivoting by hand, whereby the clamping block 10 can be displaced in the rectangular recess 16 of the bearing block in the direction of the arrow 18, i.e., transversely to the shaft 21 of the strip 22. After reaching the required angular position of the spoiler 3, the clamping block 10 is fixed by tightening the two fastening devices in the rectangular recess 16 of the bearing block 2 as a consequence of the friction effect hereby induced. Since the rack 19 of the clamping block 10 engages positively, at least in sections, with the ring gear segment 23 formed underneath the strip in any angular position of the spoiler 3, any uncontrolled adjustment of the spoiler 3 is eliminated after fixing the clamping block 10 in the recess 16 by the screws 26.

The entire strip 22 including the ring gear segment 23 is preferably fabricated, according to the clamping block 10, in one piece from a high-strength steel material by a wire erosion technique.

On a rear side of the strip 22 not provided with a reference numeral, a pin, a projection, or the like may be disposed, if necessary, in the area of the ring gear segment 23, which pin, projection or the like effects a delimitation of the possible angular positions of the spoiler 3 by cooperating with the delimiting recess 20 in the bearing block 2 in the area of the U-shaped recess 13.

Figure 6:
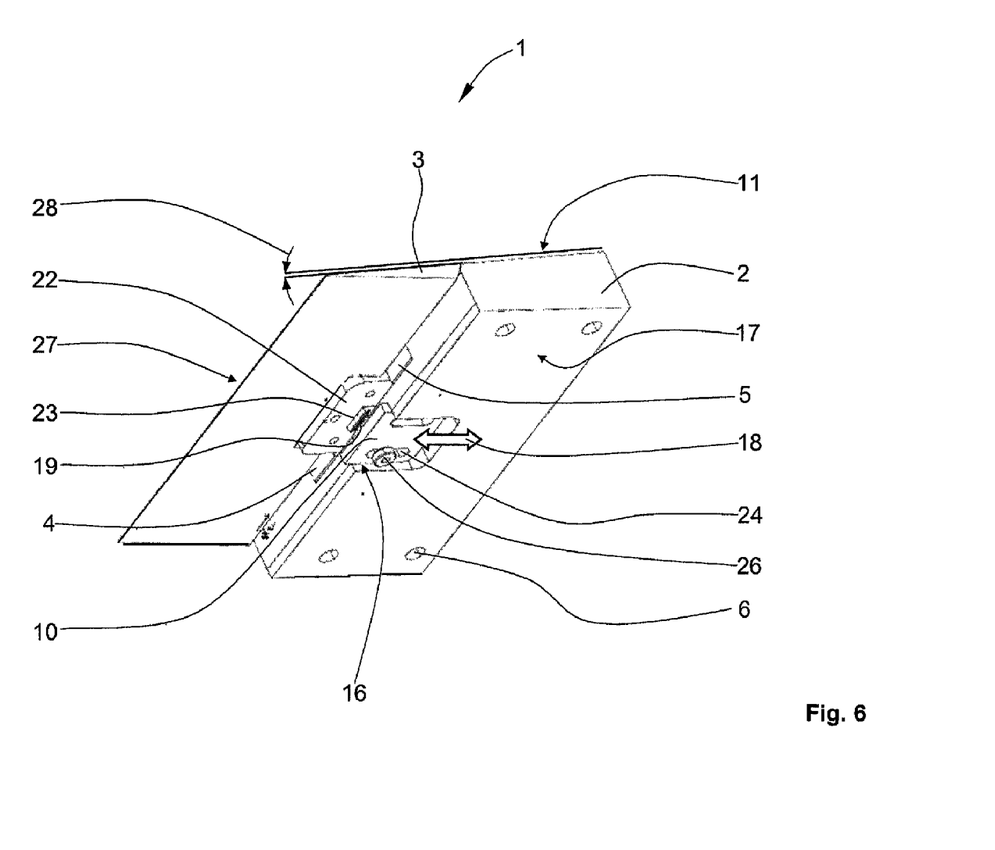
FIG. 6 shows an underside isometric view of the substantially complete apparatus.
Figure 7:
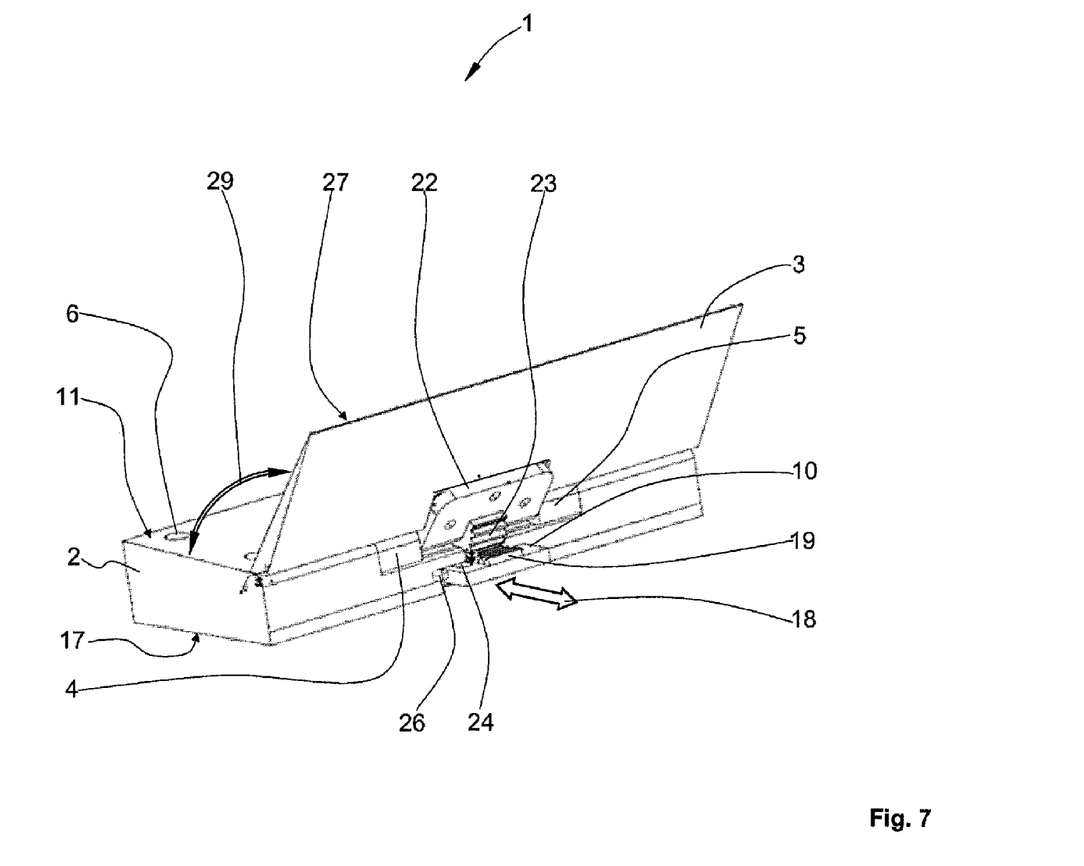
FIG. 7 shows a rear-side isometric view of the apparatus with pivoted-up aerodynamic active surface.

As the description is continued further, reference is made at the same time to FIG. 6 and FIG. 7.

FIG. 6 illustrates the complete apparatus 1 in an isometric view from below, wherein the spoiler 3 or a spoiler upper side 27 occupies an angular position 28 of about 0 degrees in relation to the bearing block upper side 11 in the position shown.

The clamping block 10 is fixed by the screw 26 disposed in the elongate hole 24 in the rectangular recess 16 in the area of the bearing block underside 17 so that any movement of the clamping block 10 and therefore any change in the angular position 28 is eliminated. The spoiler 3 is fastened on the strip 22 by three screws not shown. The shaft 21 covered in the diagram in FIG. 6 is held by the bearings 4, 5, which are inserted and fastened in the bearing block 2. The apparatus 1 is fastened to the aircraft model by suitable fastening devices, in particular screws having an internal hexagonal head or the like, by the fastening hole 6 and the other three fastening holes, not provided with a reference numeral, in the bearing block 2. Due to the ring gear segment 23 of the strip 22 intermeshing with the rack 19 of the clamping block 19 at all times, any change in the angular position 28 from 0 degrees or any displacement of the clamping block 10 in the direction of the arrow 18 is eliminated when the clamping block 10 is fixed.

FIG. 7, like FIG. 6, shows the completely mounted apparatus 1 with all the attachment parts but unlike the diagram in FIG. 6, the spoiler 3 has adopted an angular position 29 of about 45° in relation to the bearing block upper side 11.

Due to the continuously intermeshed toothings on the strip 22 and the clamping block 10, the apparatus 1 according to the invention allows a highly precise angular adjustment of an aerodynamic active surface, in particular of a spoiler 3, on an aircraft model for wind tunnel measurements, wherein the spoiler 3 may be locked in any angular position between −15° and +45° in a manner secure against adjustment. The bearing block 2 preferably ends substantially flush with a surface of the wind tunnel aircraft model, in order to minimize the flow resistance and to avoid as far as possible the formation of (perturbing) vortices in the air flow around the model, which are not causatively induced by the aircraft model.

In an embodiment not shown, a gravity sensor is preferably disposed on the spoiler 3, by which the respective current angular position of the spoiler 3 in relation to the bearing block upper side 11 can be measured precisely, so that in the event of corresponding deviations from a predetermined desired angular value, corrections may be made manually by displacing the clamping block 10.

The respective angular adjustment 28, 29 of the spoiler 3 may alternatively be made by other measurement methods, for example, by potentiometers coupled to the clamping block 10 and downstream analog-digital converters, optical or inductive distance measuring methods.

In another embodiment of the invention not shown, the clamping block 10 may be configured to be displaceable in a motor-driven manner, by an actuator, for example, having an electric, play-free, and preferably self-inhibiting precision spindle drive, controlled by a control and regulating device. It is hereby possible to vary the angular position of the spoiler 3 in a remote-controlled manner, whereby comprehensive series of measurements are possible in the wind tunnel with reduced expenditure on retrofitting the aircraft model.

Irrespective of the exemplary embodiment for a wind tunnel aircraft model outlined in the description, the apparatus may be applied in all areas in which rotatably mounted objects must be fixed unslippably in arbitrary angular positions. For example, the apparatus may be used for pivotable articulation of a spoiler, a rear spoiler, a front spoiler, or the like, on a wind tunnel model of an automobile.

In addition, the apparatus can advantageously be used, for example, for a rudder articulation, a trim flap articulation, a sensor flap articulation, an inlet flap articulation, a transverse stabilizer articulation on an aquadynamic model for testing and measurement purposes in a water tunnel.

According to a non-limiting embodiment of the invention, an apparatus 1 for pivotal fastening of an aerodynamic surface comprises a bearing block 2 and a strip 22 accommodated pivotally thereon on a shaft 21. The strip 22 is connected to the aerodynamic surface. The strip 22 is also operatively connected to a clamping block 10 and the clamping block 10 can be connected to the bearing block 2 for locking the active surface in an arbitrary angular position 28, 29. The clamping block 10 comprises at least two elongate holes 24, 25, into which in each case at least one fastening device for locking the clamping block 10 on the bearing block 2 can be inserted.

According to another non-limiting embodiment of the invention, an apparatus 1 for pivotal fastening of an aerodynamic surface comprises a bearing block 2 and a strip 22 accommodated pivotally thereon on a shaft 21. The strip 22 is connected to the aerodynamic surface. The strip 22 is also operatively connected to a clamping block 10 and the clamping block 10 can be connected to the bearing block 2 for locking the active surface in an arbitrary angular position 28, 29. The bearing block underside 17 has a rectangular recess 16 for displaceable accommodation of the clamping block 10, wherein the clamping block 10 is displaceable transversely to the shaft 21.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE LIST

1 Apparatus
2 Bearing block
3 Spoiler (aerodynamic active surface)
4 Bearing
5 Bearing
6 Fastening hole (bearing block)
7 Fastening hole (first bearing)
8 Fastening hole (second bearing)
9 Fastening hole (spoiler)
10 Clamping block
11 Bearing block upper side
12 Bearing block front side
13 U-shaped recess (bearing block upper side)
14 Leg
15 Leg
16 Rectangular recess (bearing block underside)
17 Bearing block underside
18 Arrow (linear movement clamping block)
19 Rack
20 Delimiting recess (bearing block)
21 Shaft
22 Strip
23 Ring gear segment
24 Elongate hole (clamping block)
25 Elongate hole (clamping block)
26 Screw (clamping block)
27 Spoiler upper side
28 Angular position (spoiler)
29 Angular position (spoiler)

What is claimed is:

1. An apparatus for pivotally fastening an aerodynamic surface, the apparatus comprising:
    a bearing block;
    a clamping block connected to the bearing block and comprising at least two elongate holes;
    a pivotally mounted strip member coupled to the aerodynamic surface and to the clamping block; and
    at least one fastening device insertable into each of the at least two elongate holes for locking the clamping block relative to the bearing block,
    wherein the aerodynamic surface is lockable in at least one angular position.

2. The apparatus of claim 1, wherein the strip member pivotally mounted to the bearing block via a shaft.

3. The apparatus of claim 1, wherein the aerodynamic surface is arranged on a movable member and the strip member is fixable to the movable member.

4. The apparatus of claim 1, further comprising a rack and a ring gear segment intermeshing with one another.

5. The apparatus of claim 4, wherein the rack is arranged on the clamping block and the ring gear segment is arranged on the strip member.

6. The apparatus of claim 4, wherein the rack is integrally formed with the clamping block and the ring gear segment is integrally formed with the strip member.

7. The apparatus of claim 4, wherein the rack and the ring gear segment each include one of teeth and involute teeth.

8. The apparatus of claim 1, wherein the bearing block comprises a rectangular recess adapted to movably receive therein the clamping block.

9. The apparatus of claim 8, wherein the rectangular recess is arranged on an underside of the bearing block and wherein the clamping block is displaceable transversely relative to a shaft that couples the strip member to the bearing block.

10. The apparatus of claim 1, wherein the bearing block comprises a recess which receives therein two bearings.

11. The apparatus of claim 10, wherein the recess is arranged on an upper side of the bearing block and is substantially U-shaped and wherein the two bearings are capable of being fastened in the recess and capable of coupling the strip member to the bearing block via a shaft.

12. The apparatus of claim 1, wherein the bearing block is capable of being fastened to a wind tunnel model of an aircraft.

13. The apparatus of claim 1, wherein at least one of:
    the at least one angular position is between −15° and +45° in relation to an upper side of the bearing block; and
    the aerodynamic surface is lockable via the clamping block in the at least one angular position.

14. A method of locking an aerodynamic surface in at least one angular position using the apparatus of claim 1, the method comprising:
    pivoting the aerodynamic surface relative to the bearing block; and
    locking the aerodynamic surface in at least one angular position.

15. An apparatus for pivotally fastening an aerodynamic surface, the apparatus comprising:
    a bearing block;
    a clamping block connected to the bearing block;
    a pivotally mounted strip member coupled to the aerodynamic surface and the clamping block; and a rectangular recess arranged on the bearing block and being adapted to receive therein the clamping block, wherein the clamping block is capable of moving within the rectangular recess and the aerodynamic surface is lockable in at least one angular position.

16. The apparatus of claim 15, wherein the strip member pivotally mounted to the bearing block via a shaft.

17. The apparatus of claim 15, further comprising a rack and a ring gear segment intermeshing with one another, wherein one of:

the rack is integrally formed with the clamping block and the ring gear segment is integrally formed with the strip member; and the rack is arranged on the clamping block and the ring gear segment is arranged on the strip member.

18. The apparatus of claim 15, wherein the rectangular recess is arranged on an underside of the bearing block and wherein the clamping block is displaceable transversely relative to a shaft that couples the strip member to the bearing block.

19. The apparatus of claim 15, wherein the bearing block comprises a recess which receives therein two bearings, wherein the recess is arranged on an upper side of the bearing block and is substantially U-shaped, and wherein the two bearings are capable of being fastened in the recess and capable of coupling the strip member to the bearing block via a shaft.

20. The apparatus of claim 15, wherein the bearing block is capable of being fastened to a wind tunnel model of an aircraft, wherein the at least one angular position is between −15° and +45° in relation to an upper side of the bearing block, and wherein the aerodynamic surface is lockable via the clamping block in the at least one angular position.

21. A method of locking an aerodynamic surface in at least one angular position using the apparatus of claim 15, the method comprising:

pivoting the aerodynamic surface relative to the bearing block; and locking the aerodynamic surface in at least one angular position.

22. An apparatus for pivotally fastening an aerodynamic surface to a wind tunnel model, the apparatus comprising:

a mountable member mountable to the wind tunnel model;

an adjustment member adjustably coupled to the mountable member;

a strip member coupled to the aerodynamic surface and pivotally mounted to the mountable member via a shaft; and fasteners for locking the adjustment member in at least one position relative to the mountable member, wherein the aerodynamic surface is lockable in at least one angular position relative to the mountable member via the adjustment member.

23. A method of locking an aerodynamic surface in at least one angular position using the apparatus of claim 22, the method comprising:

pivoting the aerodynamic surface relative to the mountable member; and locking the aerodynamic surface in at least one angular position.

* * * * *